US012797269B2

(12) United States Patent
Jaradi et al.

(10) Patent No.: US 12,797,269 B2
(45) Date of Patent: Nov. 17, 2026

(54) VEHICLE WITH PERSONAL MOBILITY DEVICE ANCHOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 769 days.

(21) Appl. No.: 18/320,290

(22) Filed: May 19, 2023

(65) Prior Publication Data

US 2024/0382357 A1 Nov. 21, 2024

(51) Int. Cl.
*A61G 3/08* (2006.01)

(52) U.S. Cl.
CPC .................................. *A61G 3/0808* (2013.01)

(58) Field of Classification Search
CPC .... A61G 3/0808; B60P 7/0807; B60P 7/0815; B60P 7/0892; B60N 2/245
USPC ..................... 410/4, 7–12, 23, 97, 104, 130; 296/65.04; 297/DIG. 4
See application file for complete search history.

(56) References Cited

U.S. PATENT DOCUMENTS

| | | | | |
|---|---|---|---|---|
| 4,688,843 | A * | 8/1987 | Hall | A61G 3/0808 410/105 |
| 4,995,775 | A * | 2/1991 | Gresham | A61G 3/0808 410/12 |
| 2006/0257223 | A1* | 11/2006 | Saldana | B60P 3/073 410/3 |
| 2008/0247837 | A1* | 10/2008 | Cardona | A61G 3/0808 410/23 |
| 2011/0123286 | A1* | 5/2011 | Van Roosmalen | A61G 3/08 410/7 |
| 2016/0121779 | A1* | 5/2016 | Cencer | B60P 3/075 410/3 |

FOREIGN PATENT DOCUMENTS

| | | | |
|---|---|---|---|
| KR | 100439802 | B1 | 7/2004 |
| KR | 101764141 | B1 | 8/2017 |
| KR | 20210033611 | A | 3/2021 |
| KR | 102497319 | B1 | 2/2023 |

OTHER PUBLICATIONS

"Autoadapt Carosafe Wheelchair Dock Transport Securement KTD," www.yahoo.com, 2009, 3 pages.

* cited by examiner

*Primary Examiner* — Hilary L Gutman
(74) *Attorney, Agent, or Firm* — Frank A. Mackenzie; Brooks Kushman P.C.

(57) ABSTRACT

A vehicle includes a vehicle body having a floor. The vehicle includes a track supported by the floor. The vehicle includes a first anchor supported by and movable along the track, the first anchor configured to engage with a personal mobility device. The vehicle includes a second anchor supported by and movable along the track, the second anchor configured to engage with the personal mobility device.

20 Claims, 6 Drawing Sheets

VEHICLE WITH PERSONAL MOBILITY DEVICE ANCHOR

BACKGROUND

Passenger vehicles are not typically designed to accommodate wheelchairs or other personal mobility devices. Therefore, accommodations for wheelchairs in vehicles are typically installed with aftermarket modifications to a production vehicle. For example, a vehicle may be modified with a lift or the like to load a personal mobility device onto a vehicle. Often, a personal mobility device will be stowed in a cargo area once a passenger is transferred to a vehicle seat. Production vehicles typically do not have the ability to accommodate the personal mobility device of an occupant in a manner allowing the occupant to sit in the personal mobility device in the vehicle, or if they do, significant aftermarket modification is required.

DETAILED DESCRIPTION

Figure 1:
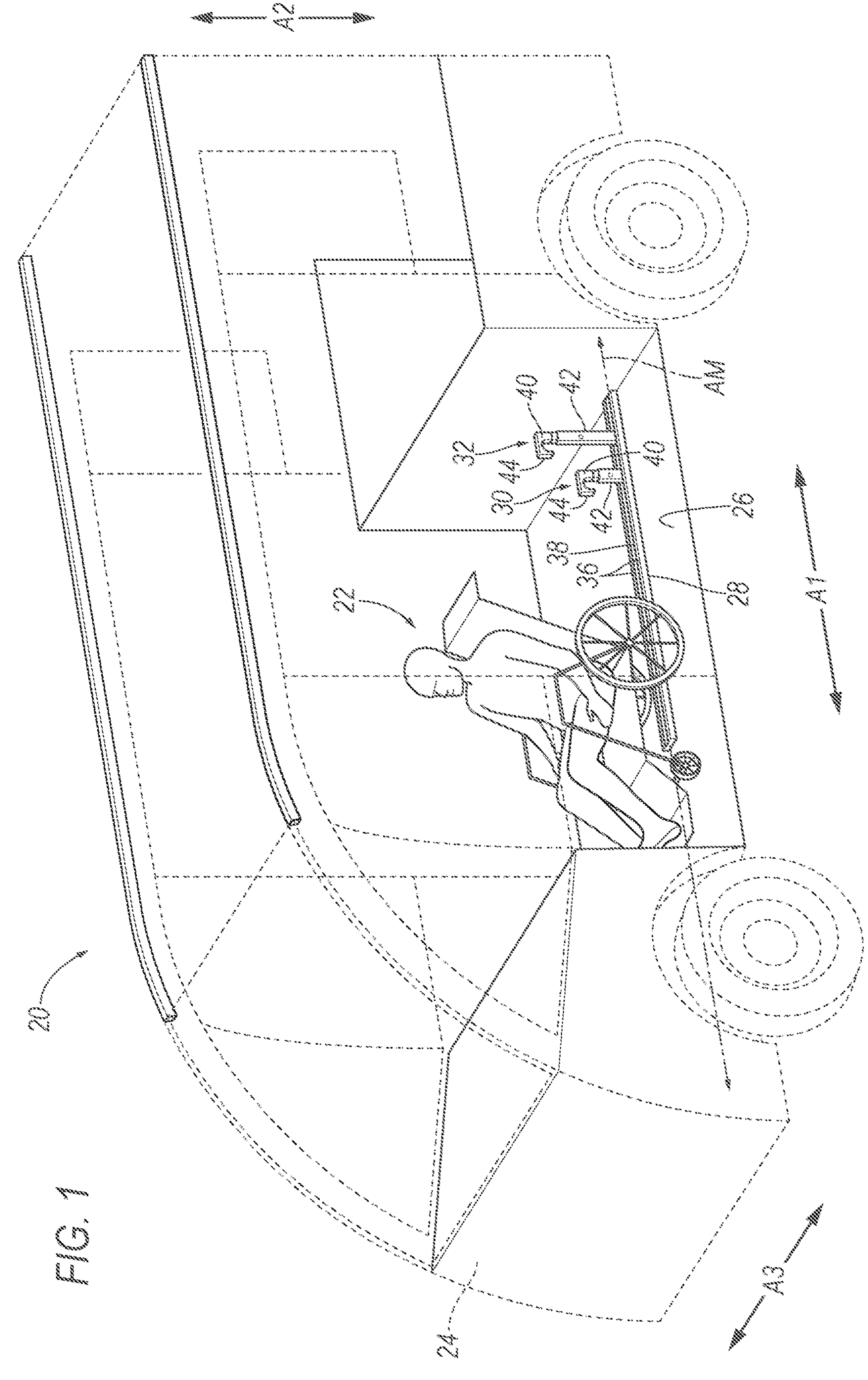
FIG. 1 is a perspective view of a vehicle with a track and anchors to secure a personal mobility device.

A vehicle includes a vehicle body having a floor. The vehicle includes a track supported by the floor. The vehicle includes a first anchor supported by and movable along the track, the first anchor configured to engage with a personal mobility device. The vehicle includes a second anchor supported by and movable along the track, the second anchor configured to engage with the personal mobility device.

The first anchor may include a hook engageable with the personal mobility device.

The first anchor may include a main portion and the hook may face forward of the main portion.

The first anchor may be forward of the second anchor.

The first anchor may be shorter than the second anchor.

The first anchor may include a main portion and a head unit engageable with the personal mobility device, the head unit removable from the main portion.

The vehicle may include a first actuator configured to move the first anchor along the track.

The vehicle may include a second actuator configured to move the second anchor along the track.

The first actuator may include a motor supported by the first anchor.

The first actuator may include a belt drive supported by the first anchor.

The motor may be lockable to limit movement of the first anchor along the track.

The first anchor may be adjustable in length.

The first anchor may include a pair of telescoping members for adjusting the length, the telescoping members slidable relative to each other.

The first anchor may include a linear actuator configured to adjust the length.

The linear actuator may include a rack and a pinion engaged with the rack.

The first anchor may include a plurality of posts engageable with the track to limit movement of the first anchor.

The first anchor and the second anchor may be adjustable in length, and the vehicle may include a computer having a processor and a memory storing instructions executable by the processor to engage the first anchor and the second anchor with personal mobility device by first commanding forward movement of the first anchor and the second anchor and next commanding change in length of the first anchor and the second anchor.

The vehicle may include a personal mobility device supported by the floor, and wherein the first anchor and the second anchor are both engaged with the personal mobility device.

The personal mobility device may be a wheelchair.

The track may define an axis of movement and the first anchor is movable on the axis of movement.

With reference to the Figures, wherein like numerals indicate like parts throughout the several views, a vehicle 20 equipped to transport a personal mobility device 22 is shown. The vehicle 20 includes a vehicle body 24 having a floor 26. The vehicle 20 includes a track 28 supported by the floor 26. The vehicle 20 includes a first anchor 30 supported by and movable along the track 28. The first anchor 30 is configured to engage with the personal mobility device 22. The vehicle 20 includes a second anchor 32 supported by and movable along the track 28. The second anchor 32 is configured to engage with the personal mobility device 22.

With reference to FIG. 1, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc. Operations, systems, and methods described herein should always be implemented and/or performed in accordance with an applicable owner's/user's manual and/or safety guidelines.

The personal mobility device 22 may be of any suitable type that supports a seated occupant and provides mobility to the seated occupant, i.e., the personal mobility device 22 transports the seated occupant outside of the vehicle 20 and can move the seated occupant in the passenger compartment during ingress to and egress from the vehicle 20. The personal mobility device 22 can support the seated occupant in the passenger compartment during operation of the vehicle 20. The personal mobility device 22 may include a frame that supports other components of the personal mobility device 22. The personal mobility device 22 may include handles, e.g., for pushing the personal mobility device 22. The personal mobility device 22 may include wheels. As another example, the personal mobility device 22 may include a continuous track. In such an example, the continuous track is in contact with ground and personal mobility device 22 may include wheels that transmit force to the continuous track. The personal mobility device 22 may include a motor operably connected to the wheels and a battery that provides power to the motor. The personal mobility device 22 may be for example, a wheelchair (as shown in the FIGS.), an electric scooter, etc. The personal mobility device 22 may be supported by the floor 26 of the vehicle body 24.

In the present description, relative vehicular orientations and directions (by way of example, top, bottom, front, rear, forward, rearward, outboard, inboard, inward, outward, lateral, left, right, etc.) is from the perspective of an occupant seated in the vehicle 20 facing forward, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle 20 aligned straight.

The vehicle 20 defines a longitudinal axis A1 which extends between a front and a rear of the vehicle 20. The vehicle 20 defines a vertical axis A2 which extends between a top and a bottom of the vehicle 20. The vehicle 20 defines a lateral axis A3 which extends between a right side and a left side of the vehicle 20. The longitudinal axis A1, the vertical axis A2, and the lateral axis A3 are perpendicular relative to each other.

The vehicle body 24 includes, e.g., a roof, one or more pillars, the floor 26, etc. The roof and the floor 26 may extend along the longitudinal axis A1 and the lateral axis A3. The roof is above and spaced from the floor 26 along the vertical axis A2. The pillars may extend from the roof to the floor 26. The vehicle body 24 defines a passenger compartment to house occupants, if any, of the vehicle 20. The passenger compartment may extend across the vehicle 20, i.e., from the right side to the left side of the vehicle 20. The passenger compartment includes a front end and a rear end with the front end being in front of the rear end during forward movement of the vehicle 20. The passenger compartment is between the roof and the floor 26 along the vertical axis A2.

The vehicle body 24 may be of a unibody construction in which a vehicle frame is unitary with the vehicle body 24, as shown in the example in the Figures. As another example, the vehicle body 24 and vehicle frame may have a body-on-frame construction (also referred to as a cab-on-frame construction) in which the vehicle body 24 and vehicle frame are separate components, i.e., are modular, and the vehicle body 24 is supported on and affixed to the vehicle frame. Alternatively, the vehicle frame and vehicle body 24 may have any suitable construction. The vehicle frame and vehicle body 24 may be of any suitable material, for example, steel, aluminum, and/or fiber-reinforced plastic, etc. The vehicle body 24 may include body panels partially defining an exterior of the vehicle 20. The body panels may present a class-A surface, e.g., a finished surface exposed to view by a customer and free of unaesthetic blemishes and defects.

The floor 26 of the vehicle 20 supports objects, such as seats, occupants, the personal mobility device 22, etc., within the passenger compartment. The floor 26 may extend from the front end to the rear end of the passenger compartment and from the right side to the left side of the vehicle 20.

The track 28 controls movement of the first anchor 30 and the second anchor 32 relative to the vehicle body 24. For example, the first anchor 30 and the second anchor 32 may be translatable along the track 28 in a straight line. The track 28 may be elongated along the longitudinal axis A1. The track 28 defines an axis of movement AM. The track 28 may permit movement of the first anchor 30 and the second anchor 32 linearly along the axis of movement AM, and inhibit movement of the first anchor 30 and the second anchor 32 transverse to the axis of movement AM. The axis of movement AM may be parallel to the longitudinal axis A1 of the vehicle 20. The track 28 may be C-shaped in cross-section, or any suitable shape. The track 28 may at least partially enclose a channel 34 elongated along a length of the track 28. The track 28 may include a pair of lips 36 extending toward each other and defining a passage 38 therebetween. The passage 38 may be elongated along the length of the track 28. The passage 38 may be open to channel 34. The track 28 may be metal, or any suitable material. The track 28 may be supported by the floor 26 of the vehicle 20. For example, the track 28 may be fixed to the floor 26 via fastener, weld, or other suitable structure.

Figure 2:
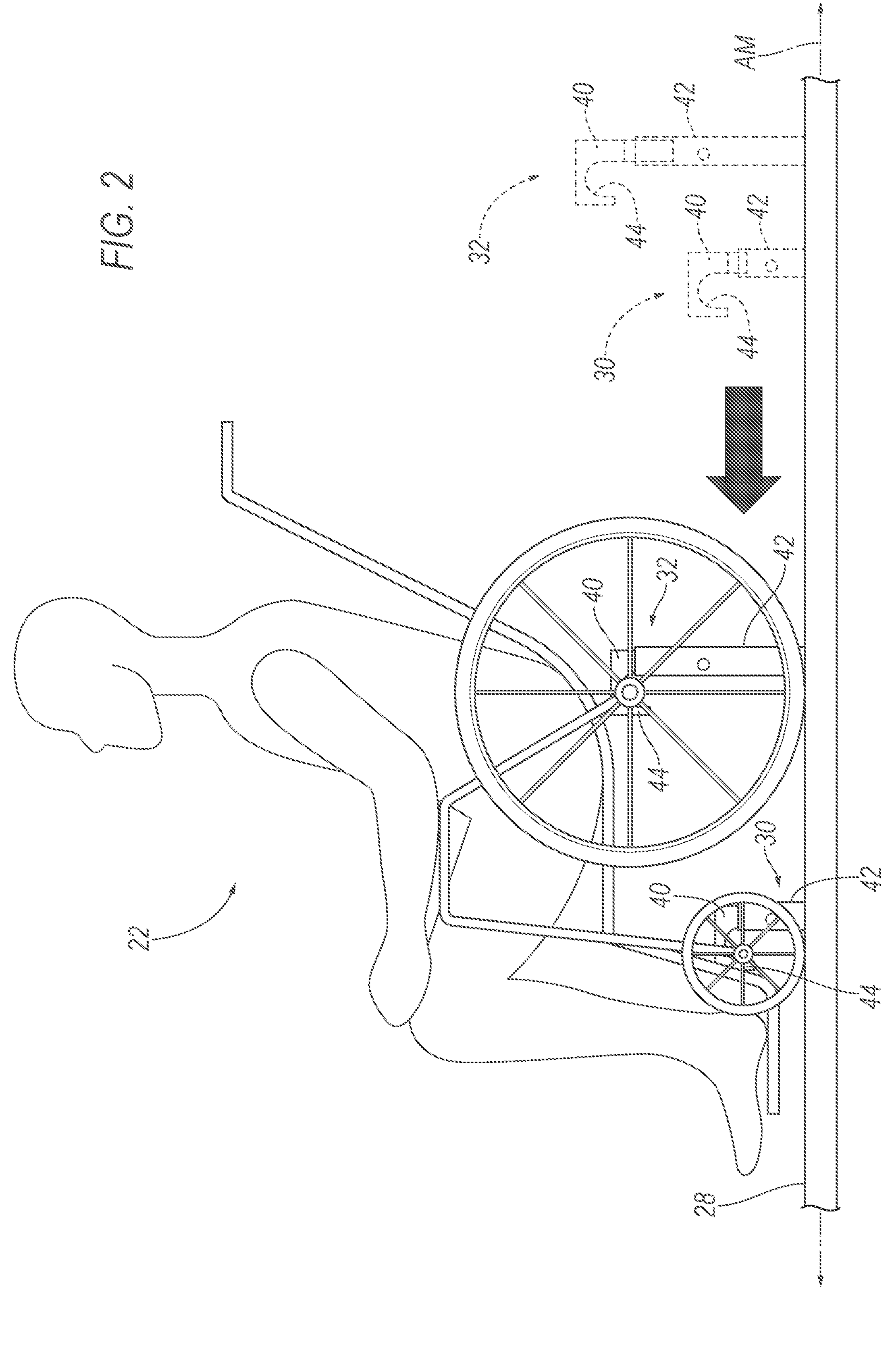
FIG. 2 is a side view of the track and the anchors to secure the personal mobility device.

The first anchor 30 and the second anchor 32 are configured to engage with the personal mobility device 22 to secure the personal mobility device 22 to the vehicle 20 and inhibit motion of the personal mobility device 22 relative to the vehicle 20, as further described below. Both the first anchor 30 and the second anchor 32 are shown disengaged from the personal mobility device 22 in FIG. 2 in broken lines at a first position and shown engaged with the personal mobility device 22 in FIG. 2 in solid lines at a second position.

The first anchor 30 and the second anchor 32 may each include a head unit 40 supported by main portions 42 of the first anchor 30 and the second anchor 32. The head units 40 are engageable with the personal mobility device 22. For example, each head unit 40 may include a hook 44 engageable with the personal mobility device 22. The hooks 44 may engage, for example, an axle of the personal mobility device 22, a cross-member of the frame of the personal mobility device 22, an opening of the frame of the personal mobility device 22, and/or other suitable structure of the personal mobility device 22. The hooks 44 may both face forward of the main portion 42. In other words, the hooks 44 may be open in a vehicle forward direction, e.g., such that moving the hooks 44 forward can bring the hooks 44 into engagement with the personal mobility device 22 and moving the hooks 44 rearward can disengage the hooks 44 from the personal mobility device 22. The hooks 44 may face other directions, e.g., both rearward, or one forward and the other rearward. The first anchor 30 and the second anchor 32, e.g., the head units 40, may include additional or alternate structure to engage the personal mobility device 22, e.g., clips, straps, or any other suitable structure to secure the personal mobility device 22 to the vehicle 20 and inhibit motion of the personal mobility device 22 relative to the vehicle 20. The head unit 40 may be removable from the main portion 42. Removable means the head unit 40 can be detached from the main portion 42 without adversely affecting the head unit 40 or the main portion 42. For example, the head unit 40 may be threadedly engaged with the main portion 42, a nut and bolt may fix the head unit 40 to the main portion 42, etc. Removal of the head unit 40 may permit replacement of the head unit 40, e.g., with another head unit having a different engagement structure. The head unit 40, including the hook 44, may be metal or any suitable material.

The main portions 42 of the first anchor 30 and the second anchor 32 may extend upward from the floor 26 of the vehicle 20 to the head unit 40. The main portions 42 may be supported by bases 46 of the first anchor 30 and the second anchor 32. The main portions 42 may be fixed to the bases 46, e.g., via fasteners and/or other suitable structure. The main portions 42 may be elongated along the vertical axis A2. In other words, the main portions 42 may be longer along the vertical axis A2 than along the longitudinal axis A1 and the lateral axis A3. The main portions 42 may be metal or any suitable material.

The first anchor 30 and the second anchor 32 may be adjustable in length, e.g., along the vertical axis A2. Adjusting lengths of the main portions 42 may vary a distance between the head units 40 and the bases 46. For example, and with reference to FIG. 3, the main portions 42 of the first anchor 30 and the second anchor 32 may each include a pair of telescoping members 48, 50 for adjusting the length. The telescoping members 48, 50 are slidable relative to each other. For example, the telescoping members 48, 50 may include a first telescoping member 48 slidably disposed within a second telescoping member 50. The first telescoping member 48 may be slidable relative to the second telescoping member 50 along the vertical axis A2. Sliding the first telescoping member 48 upward relative to the second telescoping member 50 may increase the length of the main portion 42. Sliding the first telescoping member 48 downward relative to the second telescoping member 50 may decrease the length of the main portion 42. The first anchor 30 may be shorter than the second anchor 32. In other words, the second anchor 32 may extend away from the floor 26 along the vertical axis A2 farther than the first anchor 30.

The first anchor 30 and the second anchor 32 may each include a linear actuator 52 configured to adjust the respective length of the first anchor 30 and the second anchor 32. For example, the linear actuators 52 may be configured to move the first telescoping member 48 relative to the second telescoping member 50. The linear actuators 52 may include, e.g., a rack 54 and a pinion 56 engaged with the rack 54, a screw-drive, a motor, and/or other suitable structure. The motor may be operatively coupled to the pinion 56. The motor may be lockable, e.g., to inhibit movement of the telescoping members 48, 50 relative to each other and as described below.

The first anchor 30 and the second anchor 32 are both supported by the track 28. For example, the bases 46 of the first anchor 30 and the second anchor 32 may be disposed within the channel 34 of the track 28. The first anchor 30 and the second anchor 32 may abut the track 28, e.g., the bases 46 may abut the track 28 at a bottom panel 58 of the channel 34. The main portions 42 may extend away from the bases 46 through the passage 38 of the track 28. The first anchor 30 may be forward of the second anchor 32, e.g., relative to the vehicle 20 and on the axis of movement AM.

The first anchor 30 and the second anchor 32 are movable along the track 28. For example, the first anchor 30 and the second anchor 32 may both be moveable relative to the track 28 on the axis of movement AM. The bases 46 may be movable, e.g., slidable, rollable, etc., in the channel 34 on the axis of movement AM. The main portions 42 may be movable in the passage 38 along the axis of movement AM.

Figure 3:
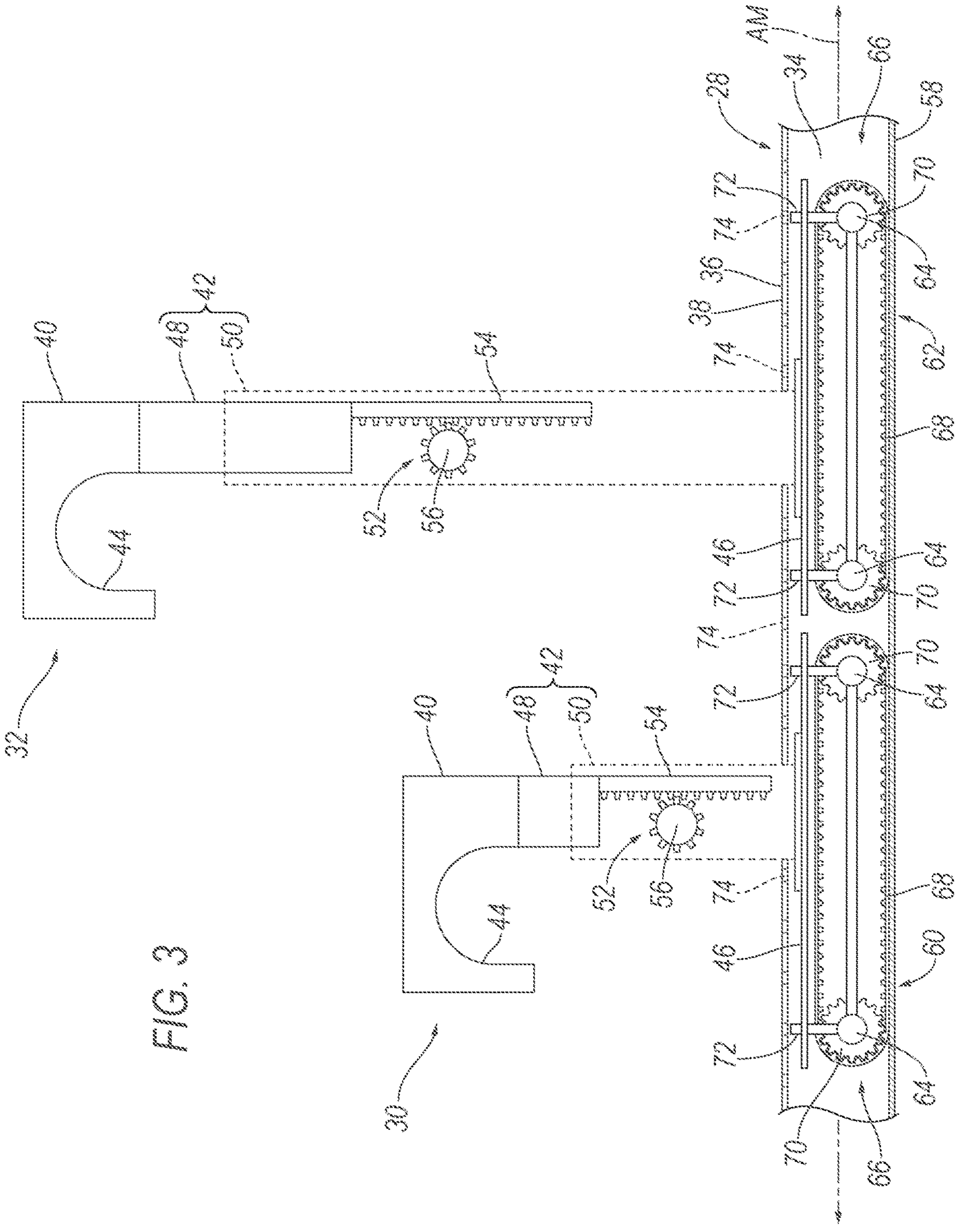
FIG. 3 is a side cross section view of the track and the anchors.

With reference to FIG. 3, the vehicle 20 may include a first actuator 60 configured to move the first anchor 30 along the track 28, and a second actuator 62 configured to move the second anchor 32 along the track 28. The first actuator 60 may be supported by the base 46 of the first anchor 30. The second actuator 62 may be supported by the base 46 of the second anchor 32. The first actuator 60 and the second actuator 62 may each include a motor 64 supported by the respective first anchor 30 and second actuator 62. The motors 64 convert electrical power into torque. The motors 64 may include a drive shaft, a stator, a commutator, a rotor, and/or other conventionally known components. The motors may be brushed or brushless. The motors 64 may be fixed to the bases 46, e.g., with fasteners, brackets, etc. The first actuator 60 and the second actuator 62 may each include a belt drive 66. The belt drives 66 may each include a belt 68 and a pair of drive wheels 70. The belts 68 may be engaged around the pairs of drive wheels 70, e.g., extending from one wheel 70 to the other wheel 70 of each pair. The motors 64 may be operative coupled to at least one wheel 70 of each pair to transfer torque from the motors 64 to the belt drives

66. The motors 64 may be operatively coupled to such wheels 70 via gears, belts, pullies, and/or other suitable structure. Additionally or alternatively, the first actuator 60 and the second actuator 62 may be supported in whole, or in part, by the track 28 or any other suitable structure of the vehicle 20. The first anchor 30 and the second anchor 32 may include any other suitable structure for moving the first anchor 30 and the second anchor 32 along the track 28, e.g., linear actuators, gears, pullies, screw-drives, chains, belts, etc.

The motors 64 may be lockable to limit, e.g., prevent, movement of the first anchor 30 along the track 28. The locked motors 64 may prevent movement of the first anchor 30 along the track 28, e.g., when force is applied to the first anchor 30 or the second anchor 32. For example, the motors 64 may include a ratchet wheel and pawl mechanism with a solenoid connected to engage and disengage the pawl to and from the ratchet wheel thereby locking and unlocking the motor 64. As another example, the motor 64 may include a self-locking worm drive. The motor 64 may include any other suitable structure for inhibit selectively motion, e.g., including those conventionally known.

Figure 4A:
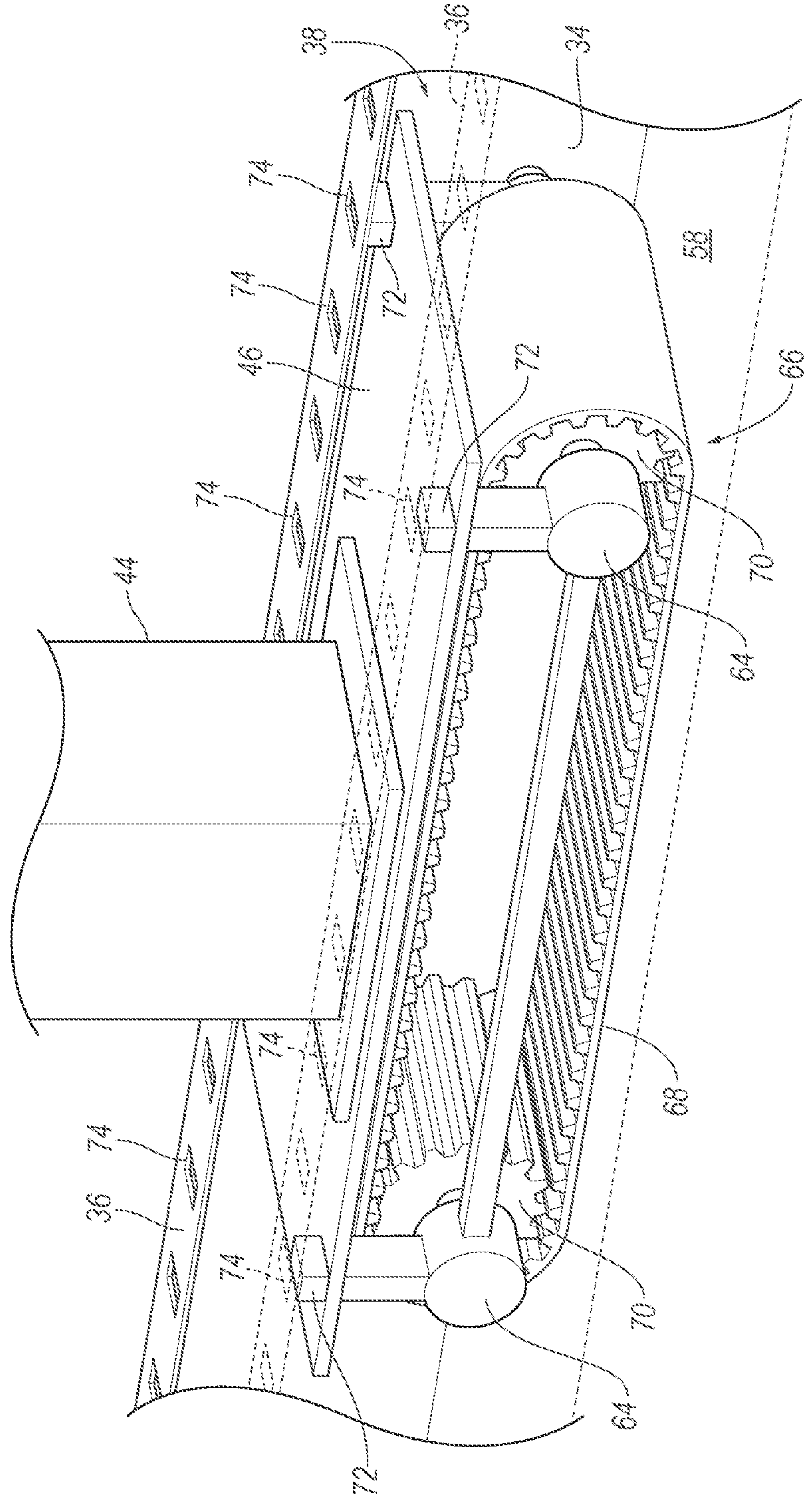
FIG. 4A is a perspective view of a portion of the track and one of the anchors in a first position.
Figure 4B:
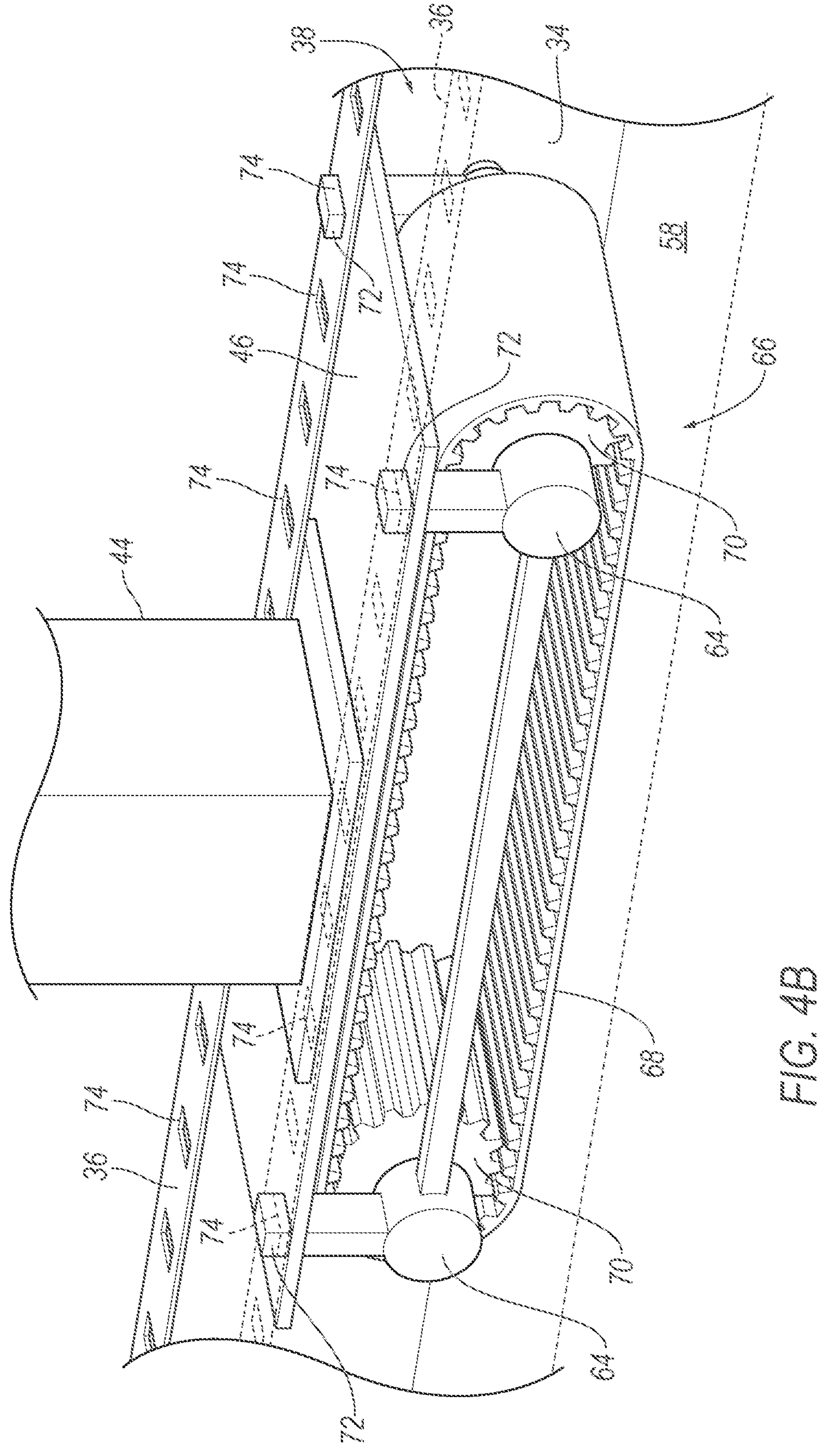
FIG. 4B is a perspective view of a portion of the track and one of the anchors in a second position.
Figure 5:
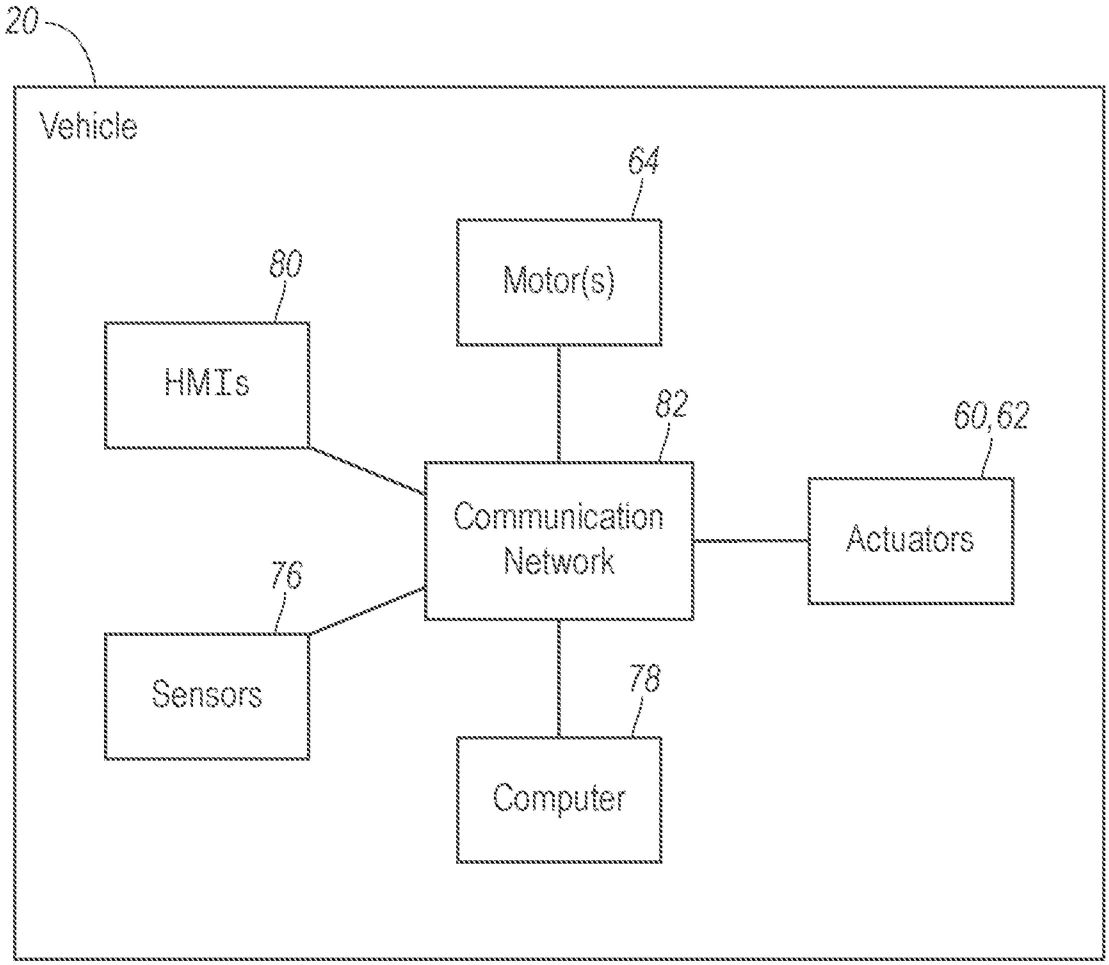
FIG. 5 is a block diagram of components of the vehicle.

The first anchor 30 and the second anchor 32 may each include includes a plurality of posts 72 engageable with the track 28 to limit movement of the respective first anchor 30 and second anchor 32. The posts 72 may extend upward from top surfaces of the bases 46, for example, toward the lips 36 of the track 28. The posts 72 engaged with the track 28 may abut the track 28, e.g., the lips 36, when the respective anchor 30, 32 is at the first position, as shown in FIG. 4A. The posts 72 disengaged from the track 28 may be spaced from the track 28, e.g., spaced from the lips 36, when the respective anchor 30, 32 is at the second position, as shown in FIG. 4B. The posts 72 may engage engagement features of the track 28, e.g., holes 74, teeth, etc. The posts 72 of the first anchor 30 and the second anchor 32 may be engaged with the track 28 by decreasing lengths of the first anchor 30 and the second anchor 32 and drawing the posts 72 upward, e.g., into engagement with the holes 74 and/or other portion of the track 28.

The vehicle 20 includes a plurality of sensors 76 that detect various states and properties of the vehicle 20 and objects therein, and provide information, e.g., to a computer 78, regarding such detections. The sensors 76 may detect, for example, a presence and/or position of the personal mobility device 22 in the vehicle 20, lengths of the first anchor 30 and the second anchor 32, positions the first telescoping member 48 relative to the second telescoping member 50, loads applied to the first anchor 30 and the second anchor 32, positions of the first anchor 30 and the second anchor 32 along the track 28, etc. The sensors 76 may include, for example, image processing devices (such as cameras), contact sensors, proximity sensors, light curtains, strain gages, hall effect sensors, weight sensors, etc. The sensors 76 may be supported by the first anchor 30, the second anchor 32, the track 28, the vehicle body 24, or any other suitable structure.

The vehicle 20 includes one or more human-machine-interfaces (HMIs 80). The HMIs 80 present data to and/or receive data from a user such as the human operator of the vehicle 20. The HMIs 80 may include dials, digital readouts, screens such as a touch-sensitive display screen, speakers, etc., for providing data to the occupant. The HMIs 80 may include one or more buttons, pedals, knobs, keypads, microphones, for receiving data from the occupant. The HMIs 80 may include a steering wheel, accelerator pedal, brake pedal, etc.

The computer 78 includes a processor and a memory. The memory includes one or more forms of computer 78 readable media, and stores instructions executable by the processor for performing various operations, processes, and methods as disclosed herein. For example, the computer 78 can be a generic computer with a processor and memory, an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 78 may be a restraints control module. The computer 78 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 78. The memory can be of any type, e.g., hard disk drives, solid state drives, servers, or any volatile or non-volatile media. The memory can store sensor data collected by and sent from the sensors 76.

The computer 78 is generally arranged for communications on a communication network 82 that can include a bus in the vehicle 20 such as a controller area network (CAN) or the like, and/or other wired and/or wireless mechanisms. Via the communication network 82, the computer 78 may transmit messages to various devices in the vehicle 20 and/or receive messages (e.g., CAN messages) from the various devices, e.g., the sensors 76, the actuators, the HMIs 80, etc. Alternatively or additionally, in cases where the computer 78 comprises a plurality of devices, the communication network 82 may be used for communications between devices represented as the computer 78 in this disclosure.

The computer 78 is programmed to, i.e., the memory stores instructions executable by the processor to engage the first anchor 30 and the second anchor 32 with personal mobility device 22. The computer 78 may engage the first anchor 30 and the second anchor 32 with personal mobility device 22 by first commanding forward movement of the first anchor 30 and the second anchor 32 and next commanding change in length of the first anchor 30 and the second anchor 32, e.g., moving the first anchor 30 and the second anchor 32 from the first position to the second position.

The computer 78 may command forward movement of the first anchor 30 and/or the second anchor 32 by transmitting one or more commands instructing actuation of the first actuator 60 and/or the second actuator 62, e.g., via the communication network 82. The commands may specify movement of each of the bases 46 to a certain position along the track 28, movement at a certain speed, movement with a certain force, movement in a certain direction, etc. The computer 78 may determine to move the first anchor 30 and/or the second (and to stop such movement) based on data from the sensors 76 and/or the HMIs 80. For example, data from a camera, weight sensor, etc., may include that the personal mobility device 22 is at a certain position in the vehicle 20, and, in response, the computer 78 may command forward movement of the first anchor 30 and/or the second anchor 32. As another example, the computer 78 may command forward movement of the first anchor 30 and/or the second anchor 32 in response to receiving information from the HMIs 80 indicating a certain input from a user. The computer 78 may determine a position to move the first anchor 30 and/or the second anchor 32 to based on data from the sensors 76 and/or the HMIs 80. For example, image data from a camera may indicate that certain structure of the personal mobility device 22 is at a certain position along the track 28. As another example, the computer 78 may store a plurality of predetermined positions in memory, the positions associated with various types and sizes of personal mobility device 22. The computer 78 may select from among the stored plurality of predetermined positions, e.g., based on an input to the HMIs 80 by a user indicating a certain type and/or size of the personal mobility device 22. Once the first anchor 30 and/or the second anchor 32 are at the commanded positions, the computer 78 may lock the motors of the first actuator 60 and/or the second actuator 62.

After commanding forward movement of the first anchor 30 and/or the second anchor 32, the computer 78 may command change in length of the first anchor 30 and the second anchor 32. The computer 78 may command change in length of the first anchor 30 and/or the second anchor 32 by transmitting one or more commands instructing actuation of the linear actuators 52 of the first anchor 30 and/or the second anchor 32, e.g., via the communication network 82. The commands may specify a certain length, an instruction to increase or decrease length, etc. The computer 78 may determine to command change in length based on data from the sensors 76 and/or the HMIs 80. For example, image data from a camera may indicate that certain structure of the personal mobility device 22 is at a certain position along the vertical axis A2. As another example, a strain gage may indicate a certain strain the first anchor 30 and/or the second anchor 32. The certain strain may be cause by tension in the first anchor 30 and/or the second anchor 32 decreasing in length and urging the posts 72 against the track 28. As another example, the computer 78 may store a plurality of predetermined lengths in memory, the lengths associated with various types and sizes of personal mobility device 22. The computer 78 may select from among the stored plurality of predetermined lengths, e.g., based on an input to the HMIs 80 by a user indicating a certain type and/or size of the personal mobility device 22.

In the drawings, the same reference numbers indicate the same elements. With regard to the media, processes, systems, methods, etc., described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C+, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:

a vehicle body having a floor;

a track supported by the floor;

a first anchor supported by and movable along the track, the first anchor configured to engage with a personal mobility device;

a second anchor supported by and movable along the track, the second anchor configured to engage with the personal mobility device; and a first actuator configured to move the first anchor along the track.

2. The vehicle of claim 1, wherein the first anchor includes a hook engageable with the personal mobility device.

3. The vehicle of claim 2, wherein the first anchor includes a main portion, and wherein the hook faces forward of the main portion.

4. The vehicle of claim 1, wherein the first anchor is forward of the second anchor.

5. The vehicle of claim 4, wherein the first anchor is shorter than the second anchor.

6. The vehicle of claim 1, wherein the first anchor includes a main portion and a head unit engageable with the personal mobility device, the head unit removable from the main portion.

7. The vehicle of claim 1, further comprising a second actuator configured to move the second anchor along the track.

8. The vehicle of claim 1, wherein the first actuator includes a motor supported by the first anchor.

9. The vehicle of claim 8, wherein the first actuator includes a belt drive supported by the first anchor.

10. The vehicle of claim 8, wherein the motor is lockable to limit movement of the first anchor along the track.

11. The vehicle of claim 1, wherein the first anchor is adjustable in length.

12. The vehicle of claim 11, wherein the first anchor includes a pair of telescoping members for adjusting the length, the telescoping members slidable relative to each other.

13. The vehicle of claim 11, wherein the first anchor includes a linear actuator configured to adjust the length.

14. The vehicle of claim 13, wherein the linear actuator includes a rack and a pinion engaged with the rack.

15. The vehicle of claim 14, wherein the first anchor includes a plurality of posts engageable with the track to limit movement of the first anchor.

16. The vehicle of claim 1, further comprising a personal mobility device supported by the floor, and wherein the first anchor and the second anchor are both engaged with the personal mobility device.

17. The vehicle of claim 16, wherein the personal mobility device is a wheelchair.

18. The vehicle of claim 1, wherein the track defines an axis of movement and the first anchor is movable on the axis of movement.

19. A vehicle, comprising:

a vehicle body having a floor;

a track supported by the floor;

a first anchor supported by and movable along the track, the first anchor being configured to engage with a personal mobility device;

the first anchor being adjustable in length, the first anchor including a linear actuator configured to adjust the length; and a second anchor supported by and movable along the track, the second anchor configured to engage with the personal mobility device.

20. A vehicle, comprising:

a vehicle body having a floor;

a track supported by the floor;

a first anchor supported by and movable along the track, the first anchor configured to engage with a personal mobility device;

a second anchor supported by and movable along the track, the second anchor configured to engage with the personal mobility device;

the first anchor and the second anchor being adjustable in length;

a computer having a processor and a memory storing instructions executable by the processor to engage the first anchor and the second anchor with the personal mobility device by first commanding forward movement of the first anchor and the second anchor and next commanding change in length of the first anchor and the second anchor.

* * * * *